Figure 1:
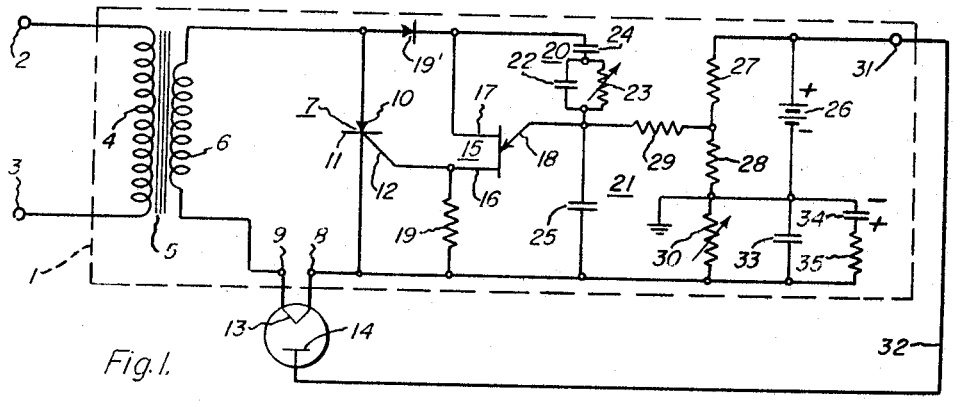

May 16, 1967 R. L. WATTERS 3,320,435
AVERAGE POWER REGULATED POWER SUPPLY FOR CONTROLLING
THE INPUT POWER TO NON-LINEAR UTILIZATION MEANS
Filed July 1, 1964 2 Sheets-Sheet 1

Inventor:
Robert L. Watters,
by John F. Ahern
His Attorney.

Inventor:
Robert L. Watters,
by John F. Ahern
His Attorney.

United States Patent Office 3,320,435
Patented May 16, 1967

3,320,435
AVERAGE POWER REGULATED POWER SUPPLY FOR CONTROLLING THE INPUT POWER TO NON-LINEAR UTILIZATION MEANS
Robert L. Watters, Schenectady, N.Y., assignor to General Electric Company, a corporation of New York
Filed July 1, 1964, Ser. No. 379,678
8 Claims. (Cl. 307—88.5)

This invention relates generally to regulated electric power supplies and more particularly pertains to such power supplies providing regulation of average power applied to non-linear power utilization means over a broad continuous spectrum of selectivity variable power levels. This invention is an improvement over my co-pending patent application Ser. No. 320,629, for "Emission Current Regulated Power Supply for Thermionic Filament," filed Nov. 1, 1963, and assigned to the assignee of the present invention.

It is frequently highly desirable to provide electric power to utilization means in a quantity that remains substantially constant at a preselected average magnitude. Sometimes the utilization means is of a type that is much more responsive to given magnitudes of power change at high input power levels than at low input power levels. When this is so, the utilization means is designated herein and in the appended claims as "non-linear."

The difficulty encountered with non-linear systems of the aforementioned type is that when a regulated power supply therefor has been adjusted to provide optimum control at one selected power magnitude, selection of another power magnitude results in ineffective control or loss of system stability and oscillations. Ineffective control results when the power setting is moved in the direction to provide less power and instability occurs when the power setting is changed to provide more power.

One example of non-linear utilization means of the type to which the present invention relates is an electronic device having a thermionic electron-emissive cathode, or filament, when it is desired to regulate the filament power by sensing the current in a circuit including an electron collector. At low power settings the electron emission is relatively insensitive to input power variations whereas at high power settings the reverse is true. In this example, the change in sensitivity of the control signal varies substantially exponentially with variations in the average input power over a broad range.

It would be highly desirable to provide an average power regulated power supply capable of controlling the input power to a non-linear utilization means over a wide range of input power. Preferably, the power supply and associated control circuit is inexpensive and simple to construct, yet maintains a closely regulated average power output.

Accordingly, it is an object of the present invention to provide an average power regulated power supply capable of controlling the input power to non-linear utilization means over a wide range of input power magnitude.

It is another object of this invention to provide a relatively simple and inexpensive power supply featuring improved regulation of average output power.

Still another object of my invention is to provide an improved emission current regulated power supply for thermionic filaments.

Briefly, in accord with one aspect of the present invention the filament of a vacuum discharge device is energized by pulses from a source of alternating current that vary in duration in response to changes in electronic emission from the filament as sensed by an electron collector. By providing periodic energization of such non-linear utilization means the sensor signal contains alternating current (A.C.) and direct current (D.C.) components having an amplitude and a magnitude, respectively, that vary in the same direction as variations in average power supplied to the filament. In accord with this invention the D.C. component controls the average power supplied to the filament and the amplitude of the A.C. component is used to counteract the variations in sensor sensitivity to provide a power supply that is both effective and stable over wide ranges of selected input power.

In one specific embodiment of the present invention a triggerable device, as a silicon controlled rectifier (SCR), determines the average power supplied to the filament in accord with the instant of firing in relation to an alternating current power cycle. The instant of firing is in turn controlled by a voltage breakdown device, as a unijunction transistor (UJT). The unijunction transistor is supplied with an emitter voltage, derived from a two-branch capacitive network, that is slightly below its required firing voltage. One capacitive branch is connected from the emitter to base-one of the UJT and additionally supplied with a substantially constant charging current. Average power regulation is achieved by connecting the sensor voltage, having the A.C. and D.C. components, to oppose charging of the last-mentioned capacitive branch.

The features of my invention that I believe to be novel are set forth with particularity in the appended claims. My invention itself, however, both as to its organization and method of operation, together with further objects and advantages thereof, may best be understood by reference to the following description taken in connection with the accompanying drawings in which:

FIGURE 1 is a schematic circuit diagram of a preferred embodiment of my invention; and, FIGURES 2 through 6 show a plurality of graphs illustrating various voltage waveforms helpful in describing operation of the circuit of FIGURE 1.

The regulated power supply within dashed line enclosure 1 of FIGURE 1 includes a pair of input terminals 2 and 3 which are adapted to be connected to a source of alternating current electric power to provide energization of primary winding 4 of transformer 5. Terminals 2 and 3 may be connected, conveniently, to a source of readily available commercial power such as the standard 115 volts, 60 cycle per second power lines.

When terminals 2 and 3 are connected to a source of alternating current power, the secondary winding of transformer 5 is energized in a well-known manner and may be considered, itself, to be the source of alternating current power for the power supply. Therefore, in the interest of simplicity and clarity, the transformer secondary winding will be considered hereinfater and in the appended claims to the source 6 of alternating current power and will be so designated. Of course, it is not required that the source of alternating current power used in the practice of my invention be a transformer secondary winding since other equivalent means may be substituted therefor, such as the output terminals of an alternating current generator or inverter, in order to more readily meet the particular requirements of a given application.

A triggerable device 7 and output means 8 and 9, adapted to be connected to power utilization means, and source 6 are all connected in series loop circuit relationship. The triggerable device establishes conduction in the loop circuit so provided for the remainder of a power half-cycle during which a trigger signal is applied to device 7. Device 7 can be a silicon controlled rectifier in which case anode 10 is electrically connected to one extremity, or terminal, of soure 6 and cathode 11 thereof is electrically connected to output means 8. Output means 9 is connected to the other extremity, or terminal, of source 6. A trigger electrode 12 serves to trigger device 7 upon application thereto of the aforementioned trigger signal.

A non-linear utilization means, as filament 13, is connected to power supply output means 8 and 9. Of course, the non-linear utilization means could as well be the heater of an indirectly heated thermionic-emissive cathode. Sensing means in the form of electron collector 14, for example, provides a unidirectional output signal with A.C. and D.C. components having an amplitude and a magnitude, respectively, that vary in the same direction as variations in average power supplied to non-linear utilization means 13. The A.C. component increases in instantaneous magnitude during intervals when device 7 is conducting and decreases in instantaneous magnitude when device 7 is not conducting, due to heating and cooling of filament 13.

Power supply 1 includes a voltage breakdown device 15 including first, second and third electrodes 16, 17 and 18, respectively. Device 15 exhibits a relatively high impedance between eletcrodes 18 and 16 when the voltage difference between electrodes 18 and 16 is less than a predetermined fraction of the voltage difference between electrodes 17 and 16. Device 15 switches to exhibit a relatively low resistance between electrodes 18 and 16 when the voltage difference between electrodes 18 and 16 exceeds the aforementioned predetermined fraction of the voltage difference between electrodes 17 and 16. Of course, device 15 can be a unijunction transistor (UJT) as illustrated or any similar device falling within the above description and providing functional equivalency.

When voltage breakdown device 15 is a UJT, the aforementioned predetermined fraction is equal to the intrinsic standoff ratio of device 15, commonly designed $n$. In typical devices the intrinsic standoff ratio is in the range from about .47 to .62, although other ranges are readily available.

Electrodes 16 and 17 of device 15 are connected in effective parallel circuit relationship with triggerable device 7. The connection can advantageously include an asymmetrically conductive device, as diode 19', connecting anode 10 to electrode 17 and resistance 19 connected from cathode 11 to both trigger electrode 12 of device 7 and electrode 16 of device 15. In this case, resistance 19 additionally serves to supply a trigger signal to trigger electrode 12 in response to switching of voltage breakdown device 15. Diode 19' is connected to pass the positive half-cycles from source 6 to device 15 and to isolate device 15 from the circuit during negative half-cycles. Thus, filament 13 is energizable from source 6 only during positive half-cycles and course 6 can be modified to provide a cyclic unidirectional voltage, if desired, as by using rectifiers.

Voltage dividing means are provided including series-connected capacitive branches 20 and 21. Capacitive branch 20 is connected from electrode 17 to electrode 18 and includes at least one capacitance 22 and parallel resistance 23 that is conveniently selected to be of variable resistance magnitude. The branch 20 preferably includes a D.C. blocking capacitance 24 connected in series with the aforementioned parallel elements 22 and 23. Capacitive branch 21 includes a capacitance 25 connected from electrode 18 to electrode 16 through resistor 19. The impedance of this capacitive branch also includes the resistive component represented by leakage current from electrode 18 to electrode 16 as well as all of the other shunt resistance including that of the charging means for capacitance 25 to be described presently.

The relative impedance of capacitive branches 20 and 21 are selected to divide the voltage from source 6 in such a manner as to provide a voltage waveform at emitter 18 that is substantially similar in shape to the waveform of the voltage between electrodes 17 and 16 but scaled-down in magnitude therefrom by more than the predetermined fraction which is equal to the intrinsic standoff ratio in the case when a UJT is used. Thus, if the intrinsic standoff ratio of a particular UJT is equal to 0.50, the capacitive and resistive components of the two branches are selected to be substantially equal but with the impedance of branch 21 being slightly less (for example, from 1 to 5 percent less) than the impedance of branch 20.

Charging means for capacitance 25 includes a source of bias voltage, conveniently a battery 26, shunted by a resistance voltage divider comprising serially connected resistances 27 and 28 with a resistance 29 connected from the junction of resistances 27 and 28 to emitter 18. A variable resistance 30 connected from the junction of resistance 28 and source 26 completes the charging current path for capacitance 25. Resistances 27 and 28 are selected to exhibit a relatively high magnitude of series resistance as compared with the internal resistance of source 26 so that essentially all of the emission current voltage drop appears across resistance 30. The series resistance of resistances 27 and 29 preferably is selected large enough to provide substantially constant current charging of capacitance 25. Collector 14 is connected to sensor input means 31, as by a conductor 32. The sensor output signal is connected to oppose the aforementioned charging means. In other words, capacitance 25 charges more slowly when the sensor input signal is large and vice versa.

The sensor signal path includes electron collector 14, conductor 32, terminal 31, source 26, variable resistance 30, output means 8 and filament 13. The interconnection between filament 13 and collector 14 is provided by thermionic electron emission from filament 13. Dominance of the aforementioned path is assured by selecting resistances 27 and 28 to exhibit much larger resistance values than the internal resistance of source 26, as discussed above. Variable resistance 30 is shunted by a capacitance 33 and a series connected damping circuit comprising capacitance 34 and resistance 35. The damping circuit is not essential.

Briefly, the general operation of the circuit of FIGURE 1 is as follows. When the voltage of emitter 18 is caused to rise to a magnitude which is a predetermined fraction, approximately one half, of the voltage difference between the voltage of second base 17 and the voltage of first base 16, there is a sharp drop in the resistance between emitter 18 and first base 16. Voltage across capacitance 25, and hence the charging rate thereof, determines the time required for emitter 18 to reach this predetermined voltage. When this voltage is reached, a sudden increase in current through resistance 19 occurs, as a result of capacitance 25 supplying energy through the suddenly decreased resistance between emitter 18 and first base 16, and a voltage pulse is applied to control electrode 12, turning device 7 (that is conveniently an SCR or the equivalent) "on," or changing the resistance between rectifier anode 10 and rectifier cathode 11 from a relatively high magnitude to a relatively low magnitude. Source 6 supplies power through the relatively low series resistance of SCR 7 to output means 8 and 9 and the power cycle continues during the remainder of the one half cycle. SCR 7 becomes non conductive during the alternate half-cycle or just prior thereto, since it is an asymmetrically conducting device.

When capacitance 25 charges rapidly, firing of SCR 7 occurs early in the half-cycle during which SCR 7 may become conductive and maximum power is available at output means 8 and 9. Conversely, when capacitance 25 charges relatively slowly, SCR 7 fires later in the power cycle and there is a reduced amount of power available at output means 8 and 9. In this way, the charging rate of capacitance 25 determines the amount of power which is supplied during the half-cycles by source 6 to any non-linear power utilization means, as a filament, connected between output means 8 and 9. The D.C. component of the sensor signal appearing across resistance 30 opposes charging of capacitance 25. Thus, adjusting the resistance magnitude of resistance 30 correspondingly adjusts the equilibrium point at which average power supplied to a given utilization means stabilizes.

In accord with the present invention the voltage of emitter 18 is caused to assume a value just below the firing voltage of UJT 15 throughout half-cycles (before firing) when SCR 7 can be rendered conductive. Thus, the circuit is rendered extremely sensitive to very slight changes in the charging rate of capacitance 25 from the aforementioned charging means. In other words, the loop power "gain" of the regulator can in this way be made essentially arbitrarily high. Stability over a wide range, while maintaining the desirable high loop gain of the system, is accomplished by reducing the regulator gain when the sensor output becomes more sensitive and vice versa. How this is accomplished by virtue of the varying amplitude of the A.C. component of the sensor signal is more clearly described in conjunction with the waveforms illustrated in FIGURES 2 through 6 wherein voltages with reference to ground, or the point of zero reference potential, are presented.

Figure 2:
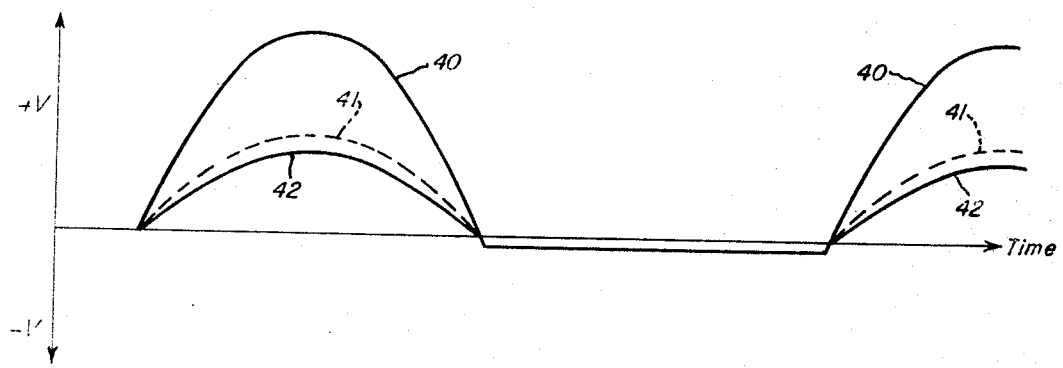

Voltage waveform 40 of FIGURE 2 represents the difference in potential between base-two 17 of device 15 and base-one 16 of device 15. The corresponding switching, or firing, potential that must be achieved by emitter 18 relative to base-one 16 is illustrated by the dashed-line curve 41. The amplitude of waveform 41 is equal to the amplitude of waveform 40 multiplied by the intrinsic standoff ratio of device 15, in the case of a UJT. Voltage waveform 42 illustrates the voltage difference between emitter 18 and base-one 16 due solely to the voltage dividing means including series-connected capacitive branches 20 and 21. It can be seen that waveform 42 does not exceed the amplitude of waveform 41 at any instant of time and thus no switching of device 15 occurs in the absence of additional charging means for capacitance 25. The waveforms of FIGURE 2 serve to illustrate the operation of the voltage dividing means and, of course, are not taken for the case wherein SCR 7 is firing to provide a useful power output to utilization means.

Figure 3:
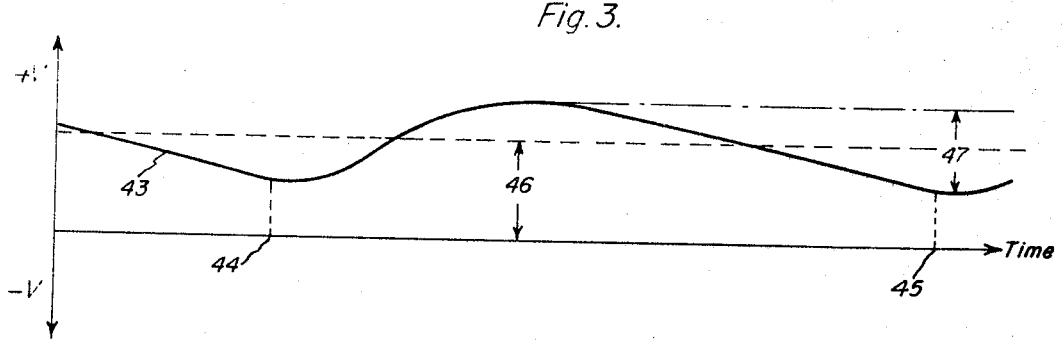

Voltage waveform 43 of FIGURE 3 illustrates the sensor waveform across resistance 30 when the triggerable device 7 is firing at successive points in time as 44 and 45, respectively. Voltage waveform 43 has a direct-current component of magnitude 46 and an alternating current component of amplitude 47. In the non-linear utilization means served by the power regulator of the present invention the magnitude of the D.C. component and amplitude of the A.C. component of the sensor signal vary in the same direction as average power supplied to the utilization means. Within limits set by thermal lag (which decreases in influence as average power increases), the A.C. component increases in instantaneous magnitude during intervals when the triggerable device 7 is conducting and decreases during intervals when the triggerable device is not conducting. The scale of the vertical axis, or ordinate, of FIGURE 3 is expanded by approximately 20 times with reference to the other waveforms, for purpose of illustration.

Figure 4:
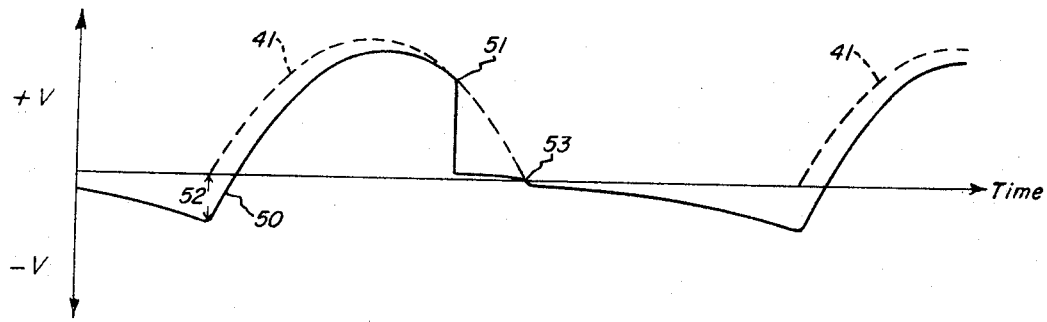

Dashed line curve 41 of FIGURE 4 represents the magnitude of firing voltage required by device 15 at various instants of time, as in FIGURE 2. Waveform 50 is representative of the difference in potential between emitter 18 and base-one 16 during normal circuit operation of the regulator of FIGURE 1. Waveform 50 is a composite of waveform 42 of FIGURE 2, waveform 43 of FIGURE 3 and the voltage supplied by the substantially constant charging means for capacitance 25. Device 15, and triggerable device 7 both switch at the time when curve 50 intersects curve 41 as at point 51. At the intersection 51 curves 41 and 50 have nearly the same slope such that small changes in sensor voltage, which result in corresponding changes in the level of waveform 50 relative to waveform 41, provide a substantial translation of point 51 along curve 41.

Figure 5:
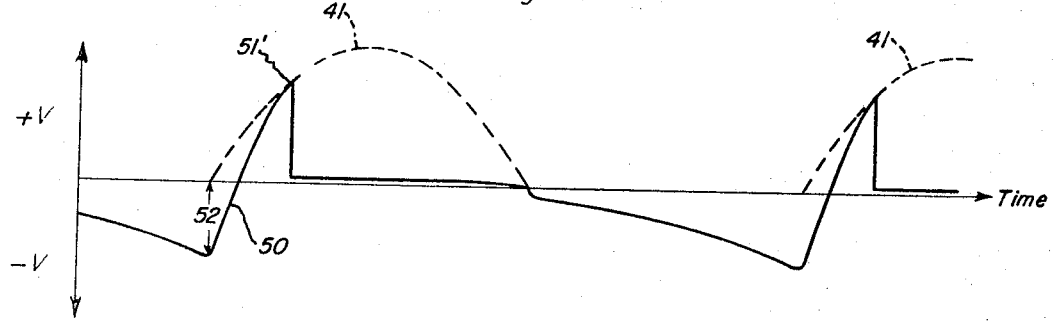

Because the A.C. component of the sensor signal, that may be likened to a saw-tooth waveform, changes in the same direction as both the sensitivity of the sensor signal and changes in the magnitude of the D.C. component of the sensor signal, sensitivity of the average power regulator system is maintained substantially constant over essentially of the settings ranging from zero to full one half cycle firing. For example, when resistance 30 is set to a lesser magnitude than for the case shown in FIGURE 4, point 51 translates to the left as seen in FIGURE 5 and more average power is supplied to the utilization means. At the same time, the alternating current component of the sensor signal increases and causes a larger voltage difference 52 at the commencement of a cycle. This introduces more of the saw-tooth waveform into voltage waveform 50 in order to increase the difference in slope between curves 41 and 50 at their intersection and thereby prevent instability that would otherwise arise.

Conversely, when resistance 30 is increased in resistance value, the saw-tooth portion of curve 50 declines in amplitude relative to the other components to provide a waveform closely resembling waveform 41 in shape at the extreme when point 51 reaches the end of the positive half-cycle at point 53. In this way, the A.C. component of the sensor signal serves to increase the gain of the regulator to offset a decrease in sensitivity of the sensor signal at low power inputs and, conversely, decreases the gain of the regulator at high power outputs, where the sensor is extremely responsive, to preserve stability.

Figure 6:
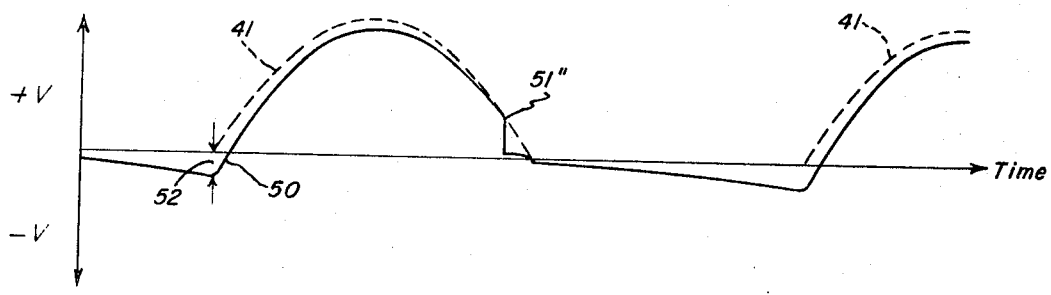

FIGURES 5 and 6 illustrate the waveforms corresponding to those of FIGURE 4 when resistance 30 is of lesser or greater magnitude, respectively, than for the case shown in FIGURE 4. Note that the slope of the curves 50 and 41 at 51' in FIGURE 5 is greater than the corresponding slope in FIGURE 4, illustrating a lesser sensitivity for the regulator portion of the circuit when higher average powers are supplied to the utilization means. Conversely, note that at the crossing at 51'' there is a lesser difference in slope than the corresponding crossing at 51, illustrating that the regulator sensitivity has been increased to compensate for decreased sensor sensitivity at low average input to the utilization means. Of course, the waveforms of FIGURES 4, 5 and 6 are not precise copies of oscillograms but have been altered to emphasize the invention. For example, the negative portions of the waveforms have been expanded.

While it is believed that the aforementioned description, including the theory of circuit operation, clearly defines my invention to those skilled in the art, the following specific component values for a circuit as shown in FIGURE 1 was found to be particularly satisfactory and is given in order to further aid those skilled in the art in the practice of my invention:

R–19—100Ω
R–23—0→100KΩ
R–27—68KΩ
R–28—27KΩ
R–29—100KΩ
R–30—0→300K k.Ω
R–35—1000Ω
C–22—0.22 μfd.
C–24—0.1 μfd.
C–25—0.033 μfd.
C–33—1.0 μfd.
C–34—40.0 μfd.
D–19'—1N1692
SCR–7—2N1770
UJT–15—2N1671A
Source 6—12 v. (R.M.S.)
B–26—150 v. D.C.

The above-mentioned specific average power regulator circuit was used with a type 5966 ion gauge tube. With a UJT 15 having an intrinsic standoff ratio of 0.5, resistor 23 was adjusted to provide a resistance value of approximately 65K ohms. A variation of the resistance value of resistance 30 from 300KΩ to 300Ω provided a smooth translation of emission current over the range from .1 to 10 milliampers. Regulation for both line voltage and pressure changes within the ion gauge tube were found to be within one percent over the input voltage range of from 75 through 135 volts and throughout the pressure range of from $10^{-3}$ to $10^{-6}$ millimeters of mercury, respectively. Adjusting resistance 23 to higher or lower values permitted comparable performance with UJT's 15 having lower or higher intrinsic standoff ratios, respectively, in the range from .47 to .62.

While only certain preferred features of the invention have been shown by way of illustration, many modifications and changes will occur to those skilled in the art. It is, therefore, to be understood that the appended claims are intended to cover all such modifications and changes as fall within the true spirit and scope of my invention.

What I claim as new and desire to secure by Letters Patent of the United States is:

1. An electric power supply for regulating average power to non-linear utilization means, said power supply comprising:
   (a) a source of alternating current power, output means adapted to be connected to said power utilization means, and a triggerable device connected in series loop circuit relationship, said triggerable device establishing conduction in the loop circuit so provided for the remainder of a power half-cycle during which a trigger signal is applied to said triggerable device;
   (b) sensing means providing a unidirectional output signal with A.C. and D.C. components having an amplitude and a magnitude, respectively, that vary in the same direction as variations in average power supplied to utilization means connected to said output means, said A.C. component decreasing in instantaneous magnitude during the intervals of power half-cycles when said triggerable device is non-conducting;
   (c) a voltage breakdown device including first, second and third electrodes and exhibiting a relatively high impedance between said first and third electrodes when the voltage difference between said first and third electrodes is less than a predetermined fraction of the voltage difference between said first and second electrodes, said voltage breakdown device switching to exhibit a relatively low resistance between said first and third electrodes when the voltage difference between said first and third electrodes exceeds said predetermined fraction of the voltage difference between said first and second electrodes;
   (d) means connecting said first and second electrodes in effective parallel circuit relationship with said triggerable device and applying said trigger signal to said triggerable device in response to switching of said voltage breakdown device;
   (e) voltage dividing means including a first capacitance coupled to said first and third electrodes and a second capacitance coupled to said second and third electrodes, said voltage dividing means providing an instantaneous voltage difference between said third and first electrodes that is substantially equal to but less than said predetermined fraction of the instantaneous voltage difference between said first and second electrodes during power half-cycles;
   (f) capacitance charging means connected to the capacitive branch located between said first capacitance and supplying charging current thereto; and
   (g) means connecting said sensing means to said charging means to enable said unidirectional output signal to oppose said charging current and provide substantial compensation for variations in the sensitivity of said sensing means throughout a broad spectrum of selected output power levels from said power supply.

2. The power supply of claim 1 wherein said voltage breakdown device is a unijunction transistor having base-one, base-two and emitter electrodes corresponding to said first, second and third electrodes, respectively.

3. The power supply of claim 1 wherein said triggerable device is a controllable rectifier.

4. The power supply of claim 1 wherein said voltage breakdown device is a unijunction transistor and said triggerable device is a controllable rectifier.

5. The power supply of claim 1 wherein said utilization means is a thermionic electron-emissive cathode and said sensing means is an anode that collects substantially all of the electrons emitted by said cathode.

6. The power supply of claim 5 wherein said triggerable device is a controllable rectifier, said voltage breakdown device is a unijunction transistor, and said predetermined fraction is equivalent to the intrinsic standoff ratio of said unijunciton transistor.

7. The power supply of claim 1 including resistance means connected in shunt with said second capacitance means.

8. The power supply of claim 7 wherein said triggerable device is a controllable rectifier, said voltage breakdown device is a unijunction transistor, and said predetermined fraction is equivalent to the intrinsic standoff ratio of said unijunction transistor.

References Cited by the Examiner

UNITED STATES PATENTS 3,111,008   11/1963   Nelson _____ 307—88.5

JOHN W. HUCKERT, *Primary Examiner.*

J. D. CRAIG, *Assistant Examiner.*